United States Patent [19]
Guyonneau et al.

[11] Patent Number: 5,684,385
[45] Date of Patent: Nov. 4, 1997

[54] CUSTOMIZED STORAGE, HIGH VOLTAGE, PHOTOVOLTAIC POWER STATION

[75] Inventors: Claude Guyonneau, Paris; Marc Aubree, Sartrouville, both of France

[73] Assignee: France Telecom, Paris, France

[21] Appl. No.: 611,134

[22] Filed: Mar. 5, 1996

[30] Foreign Application Priority Data

Mar. 24, 1995 [FR] France ................... 95 03490

[51] Int. Cl.$^6$ .................... H01M 10/44; H01M 10/46
[52] U.S. Cl. .................... 320/15; 136/293; 320/2; 320/6; 320/9; 323/906
[58] Field of Search .................... 136/293; 320/2, 320/6, 9, 15; 323/906; 429/9

[56] References Cited

U.S. PATENT DOCUMENTS

| | | | |
|---|---|---|---|
| 4,963,811 | 10/1990 | Weber | 320/1 |
| 5,131,341 | 7/1992 | Newman | 114/39.1 |
| 5,184,502 | 2/1993 | Adams et al. | 73/31.01 |

FOREIGN PATENT DOCUMENTS 2229736  10/1990  United Kingdom .

OTHER PUBLICATIONS

Intelec 10th International Telecommunications Energy Conference, pp. 475–480, Oct. 30–Nov. 2, 1988, R. De Gregorio, et al., "First Results of an Aimed Research Carried Out by the Italian P.T. Ministry Related to a Prototypical Photovoltaic Hybrid Power System for TLC".

Proceedings of the 28th Intersociety Energy Conversion Engineering Conference, vol. 1, pp. 1.414–1.419, Aug. 8, 1993, A. Ahmad, et al., "The X–Ray Timing Explorer (XTE) Power System".

Primary Examiner—Aaron Weisstuch
Attorney, Agent, or Firm—Oblon, Spivak, McClelland, Maier & Neustadt, P.C.

[57] ABSTRACT

The present invention relates to a customized storage, high voltage, photovoltaic power station, having at least one photovoltaic solar module and a customized storage device.

16 Claims, 11 Drawing Sheets

CUSTOMIZED STORAGE, HIGH VOLTAGE, PHOTOVOLTAIC POWER STATION

BACKGROUND OF THE INVENTION

FIELD OF THE INVENTION

The present invention relates to a personalized storage, high voltage, photovoltaic power station.

The technical field of the invention is that of an electric power supply at an isolated location using a photovoltaic station.

DISCUSSION OF BACKGROUND

At present, the known solar stations operating on telecommunication or data processing equipment in a power range from a few watts to several kilowatts are based on a direct current, low voltage-type storage (24 or 48 V).

As shown in FIG. 1, certain solar stations combine photovoltaic solar modules 10 of 12 V unit voltage 12 V in series-parallel groups, e.g. n columns B1 ... Bn of four modules, in order to obtain a power which is adapted to the need, and a corresponding storage battery 11 (24 or 48 V) with a capacity adapted to the sought operational duration requirements, with a view to directly and continuously supplying a utilization demand or load.

The charging of the battery 11 is controlled by a voltage regulator 12 placed between the modules 10 and the storage battery 11. The load (24 or 48 V DC) is connected to the battery across a load regulator 14, as shown in FIG. 1, which also shows the solar radiation 13.

As shown in FIG. 2, certain stations are designed differently. They consist of a double battery storage device, one battery 20 being connected to the load, whilst the other battery 21 is recharged by the solar panels 10. Changeover takes place at the end of the discharge of the battery connected to the load. The voltages of the storage batteries are identical to those of the aforementioned stations, the load also being supplied with low voltage and direct current (24/48 V).

As shown in FIG. 3, other stations more particularly intended to supply a load with alternating current have a high voltage battery 25 (110 or 220 V DC) charged by a combination of photovoltaic solar modules 10 in a series-parallel connection and an inverter (DC/AC) 26 connected after said storage battery, which transforms the direct current into alternating current for the load (110/220 AC). A regulator 27 controls the charging of the battery. However, this type of station is only infrequently or not at all used for the power levels covered by the invention. In the more specific field of telecommunications, the voltage of 48 V DC was conventionally directly used by systems (mainly electromechanical and semi-electronic systems). It is for this reason that the preferred supply and storage remained 48 V DC.

With modern technological advances, it is clear that 48 V DC only represents a minute part of the power-consumed by existing systems. Thus, telephone exchanges, like telecommunications stations of a modern nature, make use of integrated components, whose operating voltages are typically 2, 3, 5, 12, 15, 24 or 28 V DC, 48 V being marginal (radiotelephones are replacing subscriber lines).

In existing stations, the 48 V DC source supplied to the load must be transformed into all these different voltages by means of converters, which are themselves integrated into the systems. As a result, there is a considerable heat evolution at the sensitive equipments. Moreover, the different voltages supplied at the output do not benefit from a customized storage adapted to the needs for each voltage (generally the same current is not required for each voltage used in a given system).

In 24 or 48 V DC storage stations, with an operating duration on the battery of five to seven days, the battery capacity is high and the circulating currents are also high. Moreover, it is not possible to have a modularity and progressive or priority recharging (time-displaced). In order to limit voltage drops, the connecting cables must be dimensioned so as to deal with high currents at the solar modules, the storage battery, and the load. Moreover, if there is an interruption of one of the components of the storage battery, there is an interruption of the load, so that it is necessary to duplicate the battery in order to ensure the necessary operating security of the station.

Another disadvantage of existing photovoltaic power stations is that of vandalism. Thus, numerous photovoltaic solar modules (e.g. 12 V/45 Wc) disappear from the stations. They have a modest size, can easily be transported and can be immediately used (car battery charger, navigation, illumination, etc.). Moreover, there is little or no danger of electrocution in a 48 V DC station.

In addition, when the solar panels are remote from the remainder of the station, e.g. for insolation purposes, the low voltage transmission gives rise to high voltage drops, which makes it necessary to use connecting cables with a large cross-section, so as to limit the losses due to the resistance of the connecting cable and the distance.

With regard to the AC supply stations, storage takes place at the inverter. It is necessary to have a voltage regulator for charging the battery. The inverter does not have a perfect efficiency. The latter is not generally duplicated in view of its high cost, so that the station is not very reliable and has no redundancy, so that power losses are introduced into the circuit. The connection to the load takes place at a high AC voltage. The voltage drops are limited and the cross-sections of the connecting cables are smaller. However, for a multiple DC voltage load indispensable in modern equipment, it is generally necessary to introduce a 220 V AC supply, which will transform the 220 V AC into multisource DC. Such a supply is generally integrated into the equipments to be supplied, where once again no customization of the different voltages is possible. The heat evolution from these supplies is disadvantageous for satisfactory operation of the equipment.

The prior art documents [1], [2], and [3] cited at the end of the description respectively describe known photovoltaic power stations, a storage battery charging regulator for a photovoltaic generator, and a switching device for charging a battery connected to a high power photovoltaic system.

SUMMARY OF THE INVENTION

The object of the invention is to eliminate the disadvantages referred to hereinbefore, namely:
- storage on a voltage which is no longer or only infrequently used in modern systems,
- high voltage drops linked with the low voltage storage,
- large cable cross-sections and therefore high costs,
- losses associated with the efficiency of the inverter and the supply (AC supply),
- high heat losses due to the presence of converters (DC/DC or AC/DC) at the equipments to be supplied, so that it is necessary to provide special devices such as heat sinks or other cumbersome structures for the equipments, a common storage not taking account of the special features of each voltage, a necessary redundancy of the low voltage storage batteries in order to ensure power supply reliability, the attraction of solar modules for vandals, the modules being easy to handle, i.e. easy to steal and can be directly and immediately used for standard domestic purposes.

The invention therefore relates to a customized storage, high voltage, photovoltaic power station having at least one photovoltaic solar module, characterized in that it comprises a customized storage device.

Advantageously, the station also includes a main storage device, a charging regulator and a high voltage link between the main storage device and the customized storage device, the photovoltaic solar modules being in a series-parallel group.

In an advantageous embodiment, the photovoltaic solar modules are unitary voltage modules, of e.g. 55 V output. The main storage device is constituted by 110 components of 2 V nominal and a capacity which is a function of the charge and the desired operating duration without insolation. The different batteries are either of the large electrolyte reserve, lead, stationary type optionally with an electrolyte brazing system, or sealed, or of the cadmium-nickel type.

Advantageously, at least one bypass diode is placed across each storage battery component so as to ensure a continuity of operation in the case of a component fracturing.

Advantageously, the DC/DC converters arranged in parallel or in series, starting from 220 V DC for supplying the voltages necessary for the load.

Advantageously, the customized storage batteries are either of the high electrolyte reserve, stationary, lead solar battery type, or gas recombination, sealed type, or cadmium-nickel batteries. The charging and maintenance of these batteries are obtained by means of DC/DC converters, whose output voltage is regulatable from 20 to 60%.

In an advantageous configuration, a converter is equipped at the outset with an automatic charging/maintenance passage system corresponding to a change of voltage applied to the storage battery components. A filtering-regulating circuit for regulating the voltage on the load is located at the output of the converter-customized battery means. A differential amplifier amplifies the difference between the reference voltage, obtained from a Zener diode and the voltage measured at the output of the battery converter means, the reference voltage being brought to zero by a microprocessor or by a voltage presence detector, thus inhibiting the action of the regulator. In the case of a discharge of the batteries, it is the latter circuit which will regulate the discharge voltage, whilst the microprocessor limits its duration. The DC/DC converters are all in parallel, the capacity of the means taking account of the permanent current characteristic to the load, as well as the storage battery recharging current.

In another advantageous configuration, converters are allocated solely to the charging of the customized batteries. The output voltage of the converters is regulated independently of the output voltage of the converters direct on the load, the redundancy of the converters being calculated solely on the basis of the needs of the load, the battery charging circuit already being considered as a reserve circuit.

In another advantageous configuration, the high voltage storage is transferred to the customized batteries. The power is stored by at least one customized battery and it is ensured that sources are supplied by converters adapted to the storage sources.

Advantageously, in the station according to the invention, the telecommunications equipments are completely separate from the power equipments, a completely sealed and thermally insulated enclosure then being provided.

The originality of the station according to the invention is that it operates at a high voltage and a customized power storage system is proposed for each load type. The satisfactory efficiency of the means, associated with the absence of any significant heat evolution, as well as the ti natural protection against theft of the solar panels (due to operation under a voltage unusable for standard domestic needs) leads to a station which is particularly suitable-for isolated locations in hot and very sunny climates.

Such a station makes it possible to optimize the dimensioning of both the peak power (photovoltaic solar modules) and the battery capacity. Thus, the customized storage makes it possible to allocate to each utilization voltage the necessary power (combined batteries and converters).

A supplementary security is provided by the double storage system used in this station. A main storage battery is common to all the utilization voltages and a customized storage battery exists for each utilization voltage. A cumulative and configurable/modular autonomy is given to each of these storage means, so that numerous adaptation possibilities are provided with respect to charge extensions and modifications.

Advantageously, a priority or progressive recharging can take place at one or several storage batteries (adaptation of the dimensioning as a function of the so-called priority charging).

The applications envisaged by this station are numerous, because they relate to all electronic and electrical equipments, whose operating voltages are those typically and mainly used by data processing or telecommunications system designers.

The design of such a station is revolutionary for data processing and telecommunications equipment designers for isolated locations, because it assumes responsibility for the entire power management and has a favorable effect by facilitating the design of the system linked with the climatic operating conditions.

Thus, these stations are more particularly directed at designers wishing to:

manage in optimum manner the power necessary for their system, whilst ensuring a high reliability, gaining space with respect to the overall dimensions of their equipments, economize on the supply part of their system, i.e. become more competitive, increase the life of their equipments due to favorable climatic conditions, simplify to the maximum the operation and maintenance of the power station.

DETAILED DESCRIPTION OF THE PREFERRED EMBODIMENTS

Figure 1:
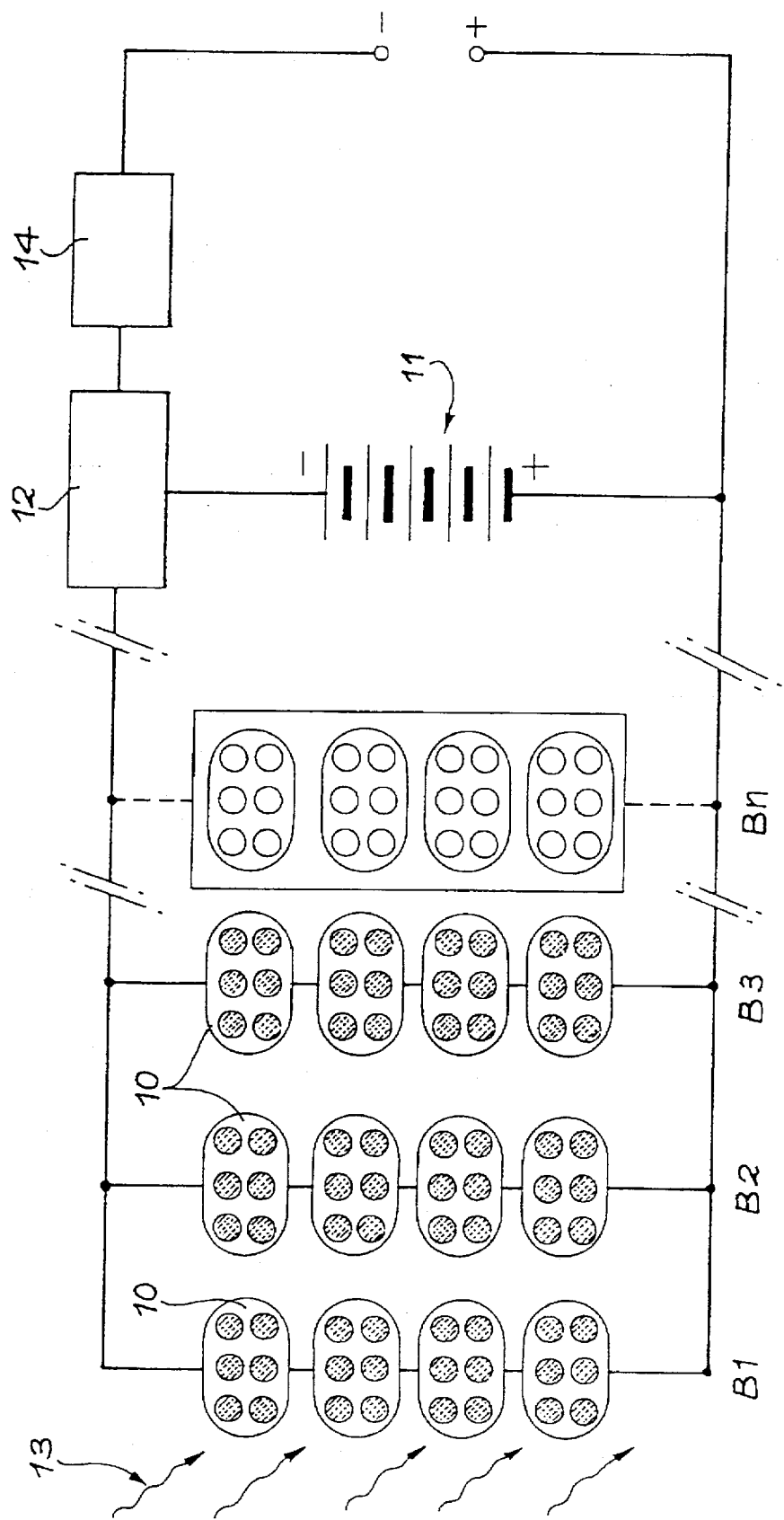
FIG. 1 illustrates a first, prior art, 48 V photovoltaic station.
Figure 2:
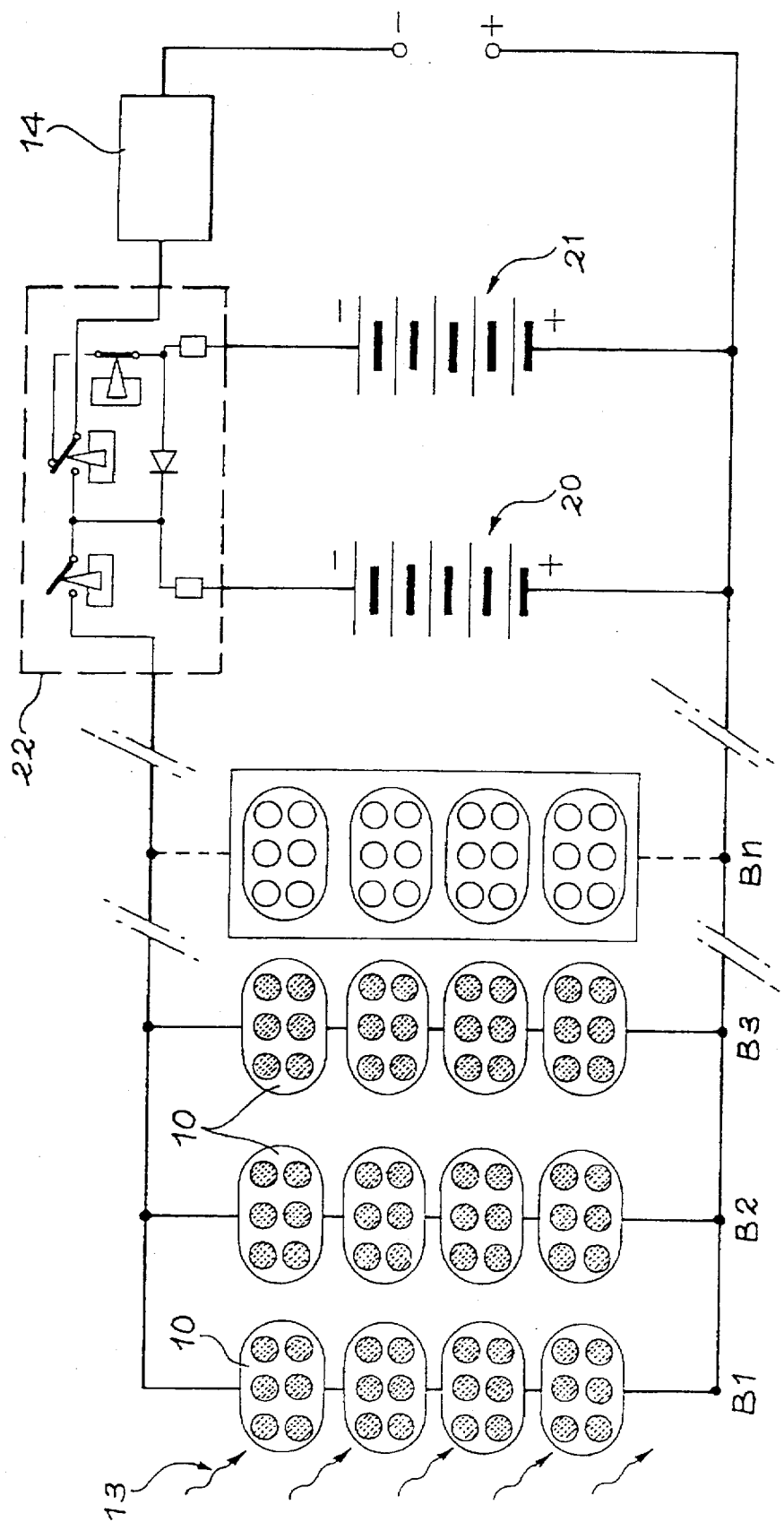
FIG. 2 illustrates a second alternative, prior art, photovoltaic station.
Figure 3:
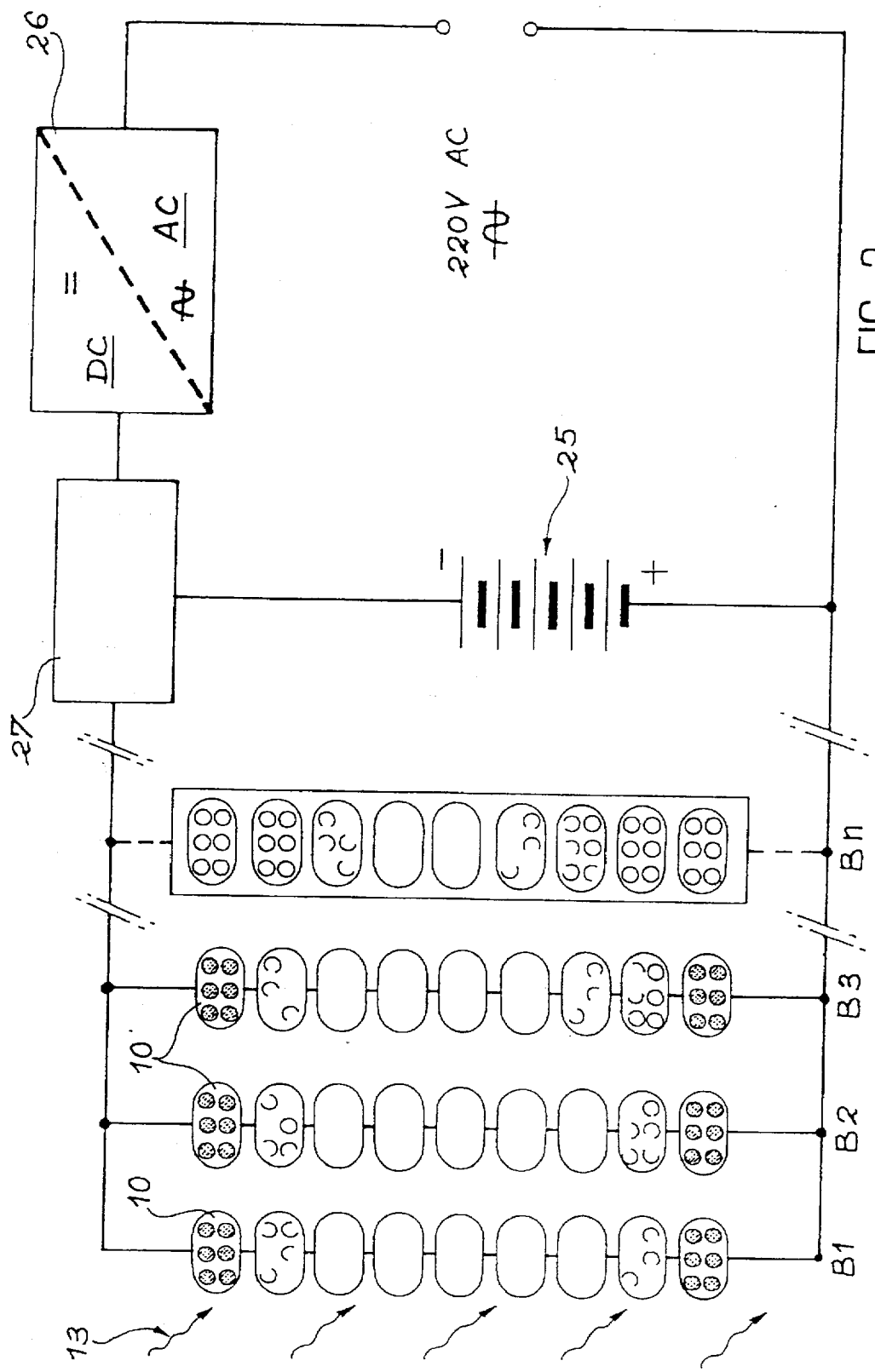
FIG. 3 illustrates a third, alternative, prior art, photovoltaic station.
Figure 4:
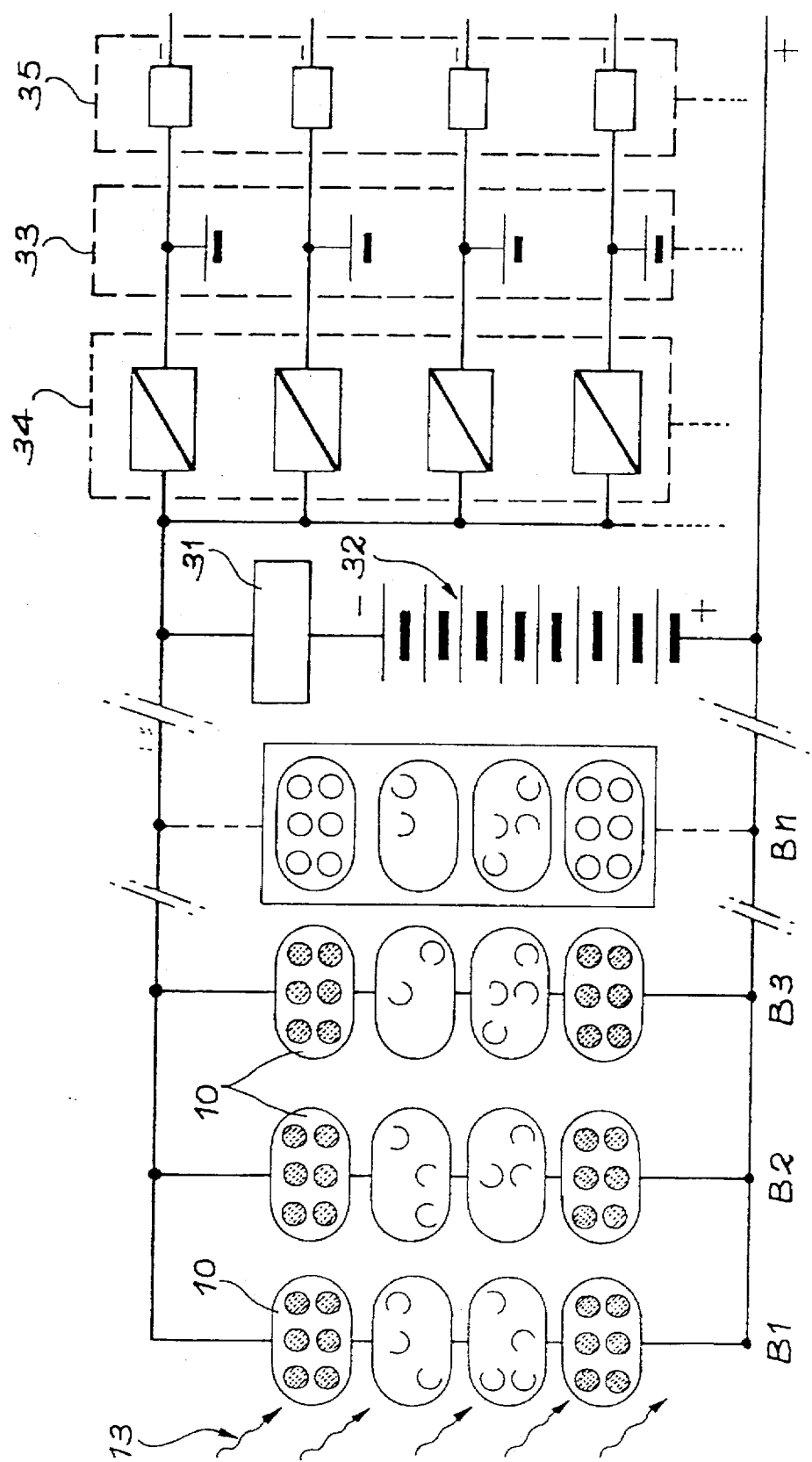
FIG. 4 illustrates a high voltage, photovoltaic station according to the invention.
Figure 5A:
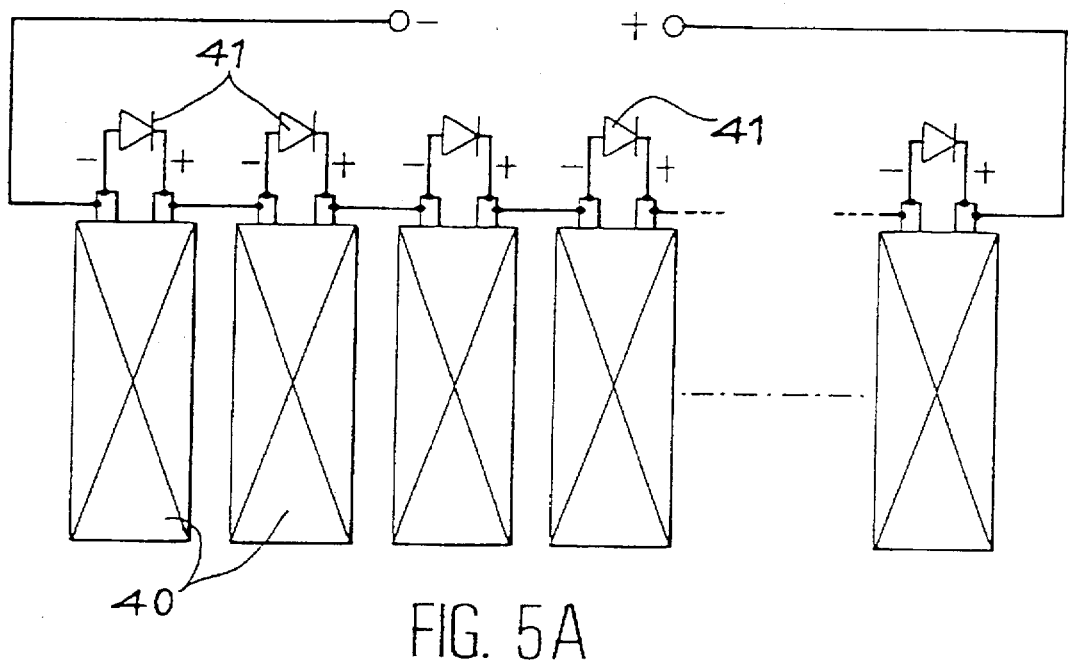
FIGS. 5A and 5B illustrate a main storage accumulator battery of the station according to the invention illustrated in FIG. 4.
Figure 5B:
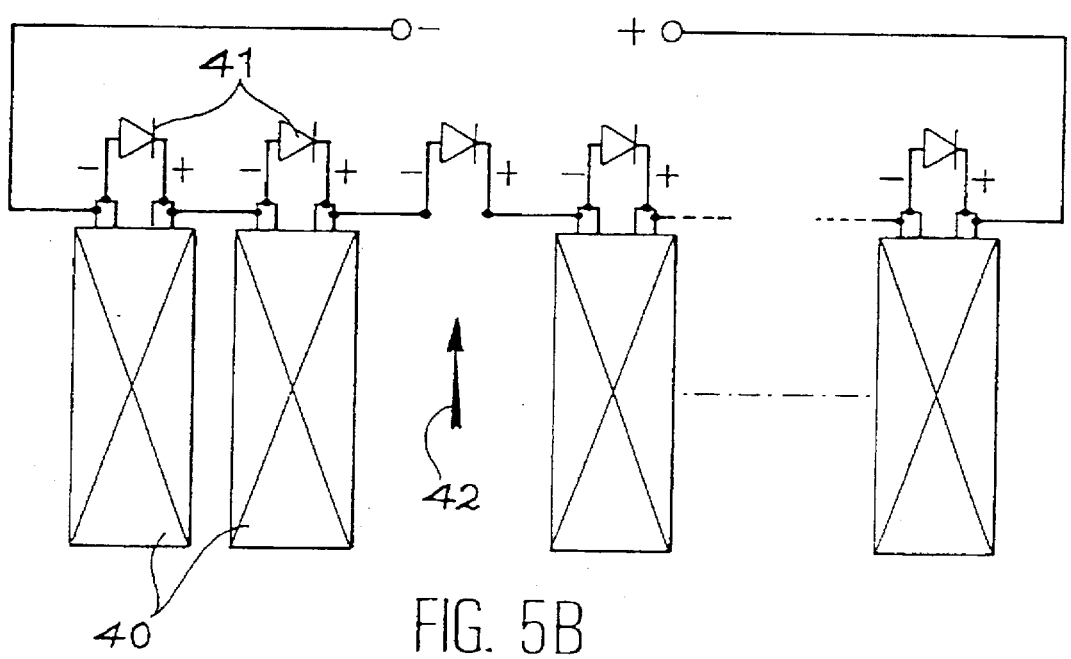
Figure 6:
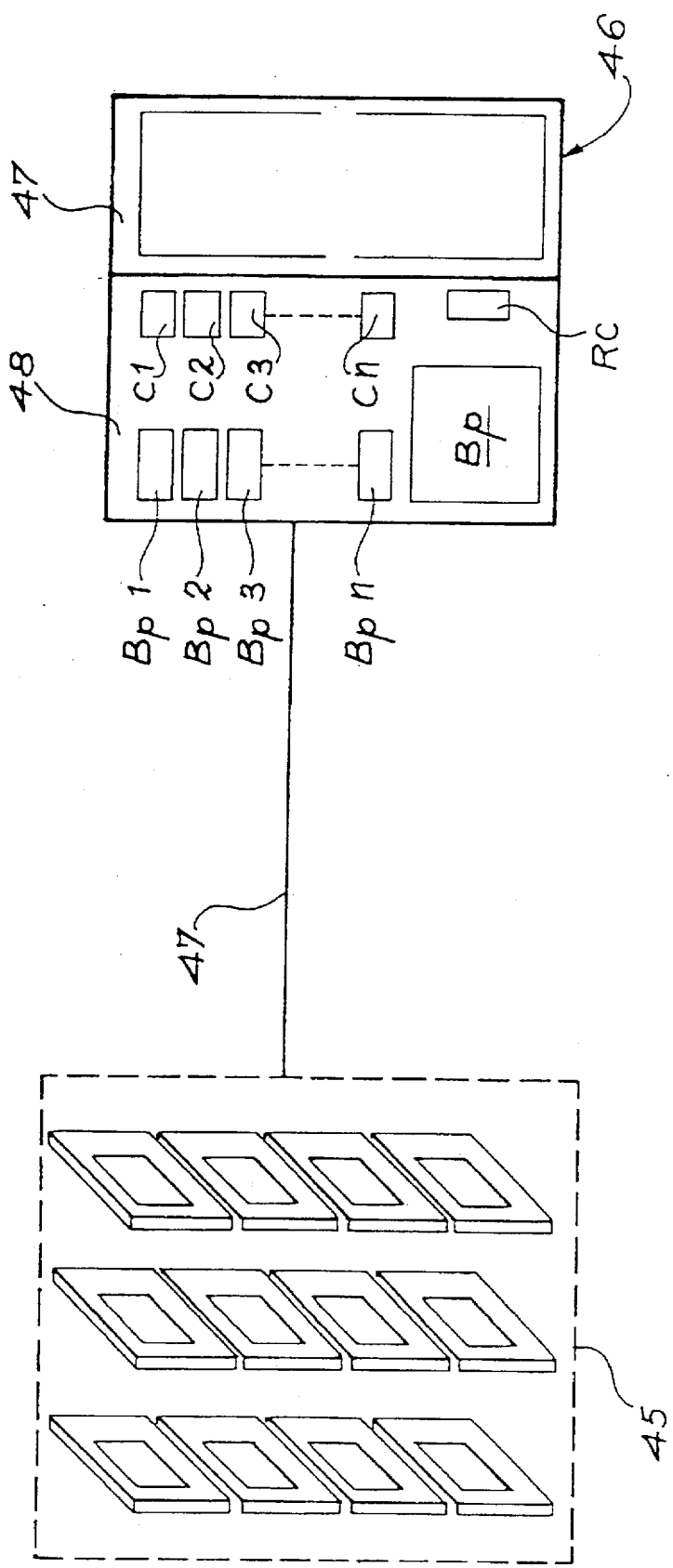
FIG. 6 illustrates the general organization of the station according to the invention.

FIG. 4 shows the general principle of the customized storage, high voltage, photovoltaic power station according to the invention. It comprises photovoltaic solar modules 10, which are unitary voltage modules, e.g. of 55 V, in series-parallel connection. Here there are groups Bi of e.g. four identical modules 10 each group forming a branch of 4×55=220 V DC. According to the needs of the load (total permanent power consumed), these groups Bi of four modules are connected in parallel. The advantage of these modules is that their unitary voltage, which does not correspond to the "standard commercial" voltages means that their theft has no interest for potential users. Moreover, the total voltage of a branch (220 V DC) is also dissuasive for theft. Moreover, the size of a 55 V module makes its handling and "camouflage" much more difficult. Advantageously, the cabling of the solar field is greatly simplified, because the number of modules is divided by four (gain as regards cables and time during installation). A battery charging regulator 31 which, as for a 48 V regulation, serves to control the voltages at the end of the charging and discharging of a main storage battery 32 and in general terms ensures the full charging of said battery and its protection. It also gives alarms in the case of an operating anomaly of the system. Its design is simpler than a 48 V regulator, because the regulating function on the load is not necessary in this type of station. The main storage battery 32 can be of the high electrolyte reserve, stationary type (solar battery), or the sealed type (no maintenance) or the cadmium-nickel type. Its operating voltage relative to the photovoltaic modules is 220 V nominal. It is therefore constituted by 2 or 1.2 V components, as a function of the battery type used and its capacity is a function of the charge and the desired duration of in operation without insolation (taking account of the customized storage defined hereinafter). For the same duration, it is pointed out that a 220 V station has a battery, whose capacity is four times lower than that of a 48 V battery. This ensures the security of the power supply in the case of a failure of a battery component by associating a bypass diode 41 with each component, as shown in FIGS. 5A and 5B (which is difficult to envisage with 48 V due to the compared capacities). It therefore becomes unnecessary to duplicate the storage battery, FIG. 5B corresponding to the breaking of a 2 V component (arrow 42). One of the original features of this station is its customized or distributed storage device 33. A link between the main storage device 33 and the personalized storage device is provided under high voltage. The voltage drop is much less than with 48 V, so that it is possible to use cables with smaller cross-sections and in particular to increase the distance between the photovoltaic solar modules, the regulator, the main battery, and the remainder of the station. There is nothing to prevent the grouping of the main and customized storage devices at one location and the connection of the photovoltaic modules, which alone would be remote, because the connection is under high voltage, as shown in FIG. 6. Thus, FIG. 6 shows all the photovoltaic solar modules or solar field 45, a shelter 46 containing the customized batteries Bpi ... Bpn, a main battery Bp, DC/DC converters C1 ... Cn, a charging regulator RC, the load and a link 47. There is also a reference load regulating means 35 (FIG. 4).

Figure 7:
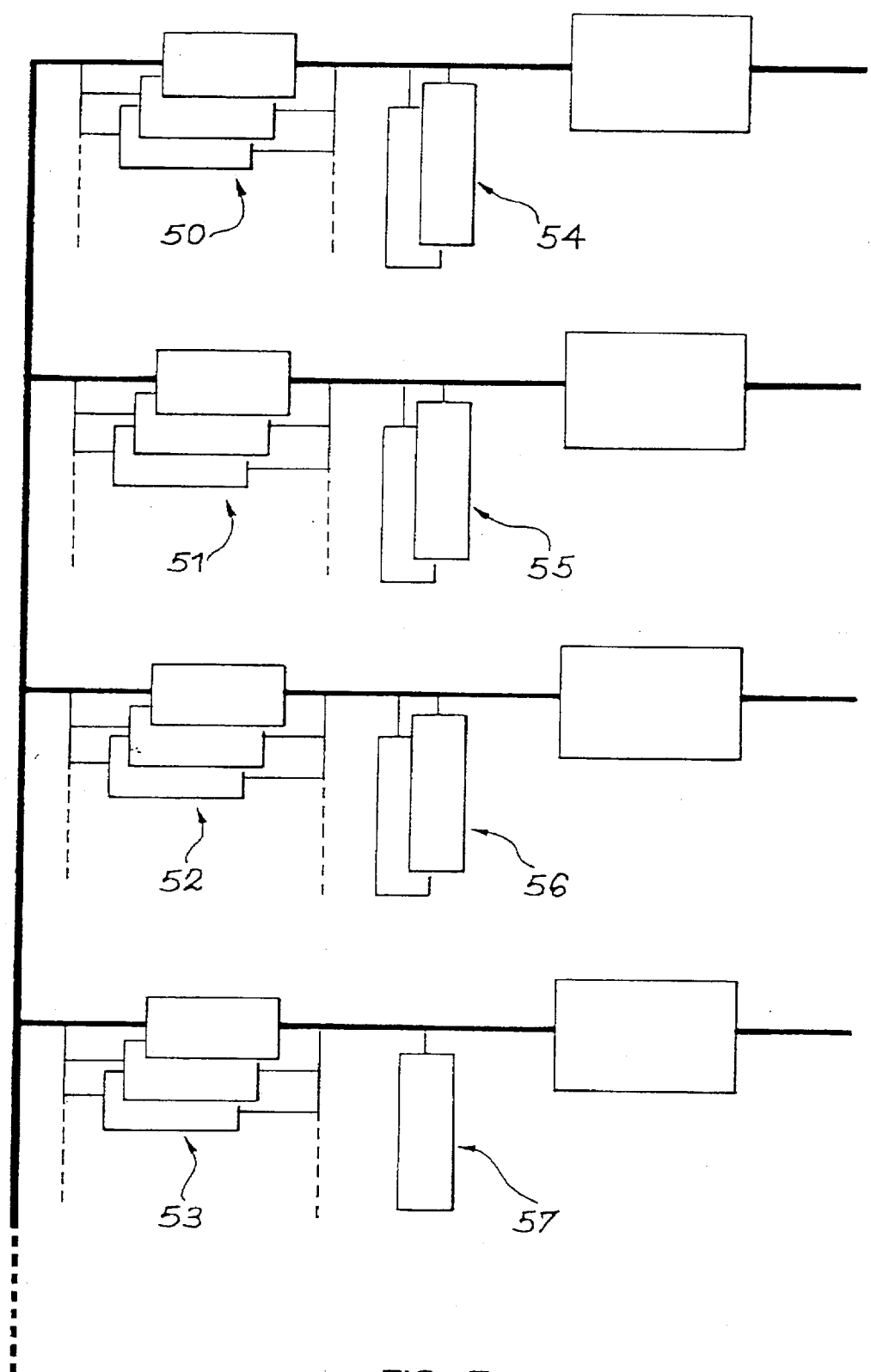
FIG. 7 illustrates the customized storage of the station according to the invention.

For implementing the customized storage device, from the incoming 220 V DC, the final load is supplied with multiple voltages and the energy balance thereof has been established beforehand (necessary voltages, necessary Currents and desired operational duration on a source by source basis). This is followed by the calculation of the necessary number of DC/DC converters 34 on a source-by-source basis, which are connected in parallel and with them is associated a battery having an adequate capacity to ensure the sought duration, as shown in FIG. 7, which shows:

220/2 V DC/DC converters (50), 220/5 V DC/DC converters (51), 220/12 V DC/DC converters (52), 220/28 V DC/DC converters (53), and 2 V batteries (54), 5 V batteries (55), 12 V batteries (56), 1 28 V battery (57).

These modular converters are located in the vicinity of the load. In the same way, the storage batteries are placed in a separate or non-separate bay, which is also close to the equipments to be supplied.

It is therefore possible to envisage sources without storage (distributed), so that an interruption of these sources does not lead to a manifest disturbance to the operation of the system. This makes clear the interest of this customization of the sources and the power optimization which can be expected.

Reference has been made to the main storage device in connection with the high voltage battery, but there is nothing to prevent the transfer of the maximum power storage to the different sources and only maintaining a reduced duration (e.g. one day) at the main battery. This arrangement leads to a better management of the ampere-hours stored and to the-optimization of the efficiencies and costs of the different components (converters and battery).

The characteristics of the invention will now be defined:

Photovoltaic solar modules with a nominal voltage e.g. close to 55 V (except for the solar panel size, nothing prevents the use of unitary modules of 110 V), the aim being to dissuade theft of the modules both due to the voltage level and the panel size. In the prior art devices, the output voltage of the modules is 12 or 24 V.

A highly simplified charging regulator compared with the standard 48 V regulator.

Different batteries which are either of the large electrolyte reserve, lead, stationary type, optionally with an electrolyte brazing system (to prevent stratification), or sealed (without maintenance), or of the cadmium-nickel type. The special feature of the system is that of placing bypass diodes on each storage battery component, so as to ensure operational continuity in the case of component breakage.

Figure 8:
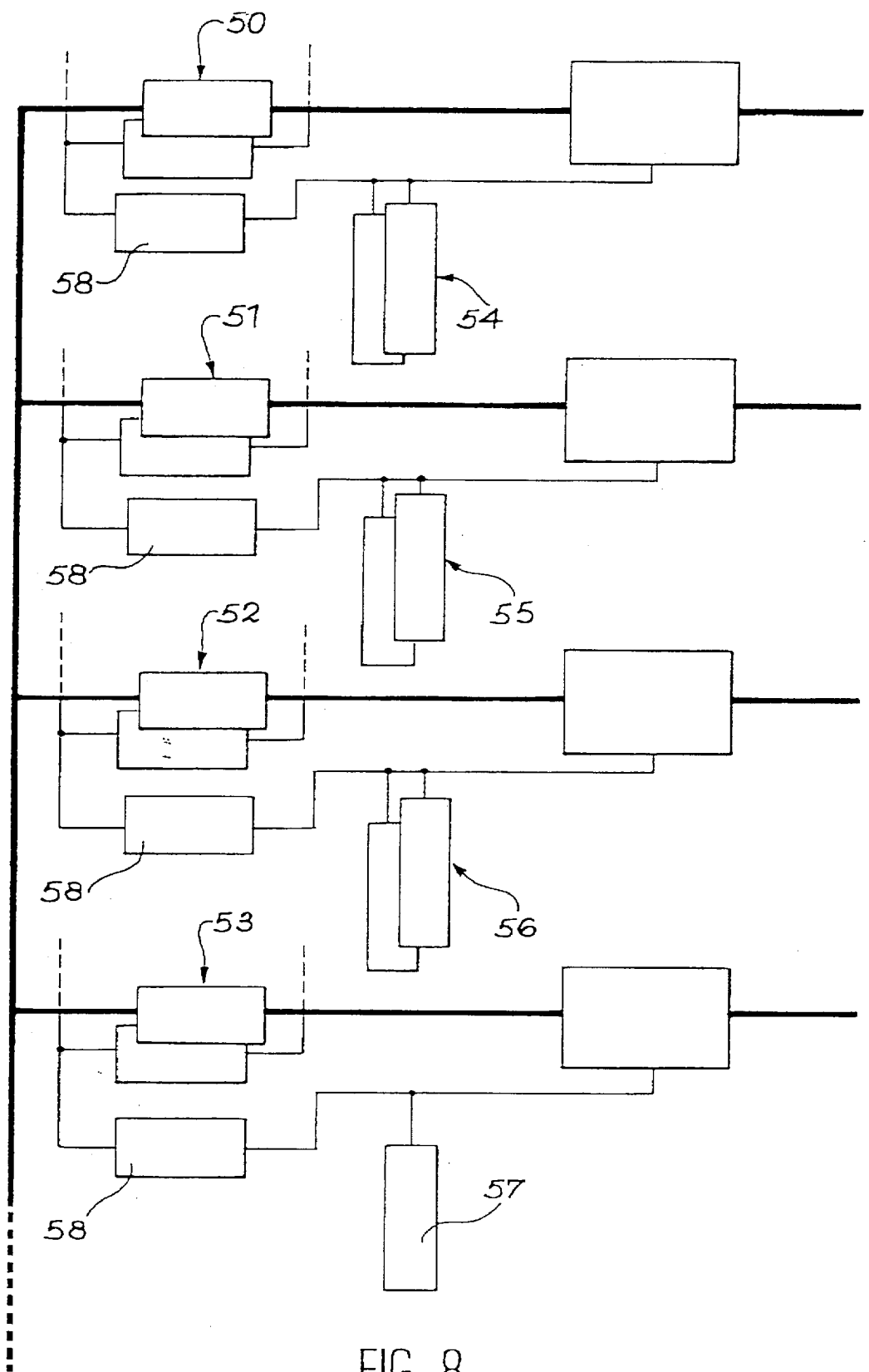
FIG. 8 illustrates a variant of the customized storage of FIG. 7.

Different DC/DC converters, starting from 220 V DC, supply the voltages necessary for the load. This type of converter is very easy to implement, e.g. for an input voltage varying between 180 and 370 V, unitary modules exist which, at the out-put, supply the requisite voltages to within ±2% with an efficiency of approximately 85% and for different unitary power levels such as 50 W, 75 W, 100 W, 150 W, 200 W, 300 W. These converters can be connected in parallel or series. They operate in a temperature range between −20° and +85° C. (converter base temperature). This temperature range makes it possible to make the equipments operate under natural ambient conditions, even in equatorial or tropical climates. The separation of the converters from the load, as shown in FIG. 8, forms part of the advantages of the invention, because all of the heat mainly generated by the AC/DC or DC/DC converter supplies and given off in the common supply/equipment enclosure are, as a result of this device, discharged in natural form to the exterior. Thus, there is a much lower operating temperature for the supplied equipments, leading to a favourable climatic environment and improved service life for the equipments.

Customized storage batteries either of the large electrolyte reserve, stationary, lead, solar battery type, or of the gas recombination, sealed type, or the cadmium-nickel type may be used. The charging and maintenance of the batteries are obtained by DC/DC converters, whose output voltage is regulatable from 20 to 60%.

This system operates in a very simple way. During insolation or sunny periods, the photovoltaic solar modules 10 supply, on the one hand the different DC/DC converters and on the other hard charge the main battery (220 V DC) across the high voltage charging regulator. If necessary, the DC/DC converters can also supply the load and recharge the different associated batteries. In a normal operating period, these batteries customized to each source are simply maintained in their full charging state. In the noninsolation or non-sunny period (night or lack of or little sunshine), the main battery supplies the ampere-hours necessary for the supply of the DC/DC converters. If the non-sunny period exceeds the discharge duration of the battery fixed by the selection of the initial dimensioning, the main battery is disconnected (function of the high voltage charging regulator) and the customized batteries take over, ensuring the supply of the ampere-hours to the load. If this second operating period of the battery exceeds the time fixed by the initial dimensioning, a security system disconnects these batteries so as to protect them against a deep discharge.

When the sunshine returns, the main battery is automatically reconnected and recharges, and in parallel, the converters are supplied. They automatically pass into the charging position and recharge the associated batteries, whilst at the same time supplying the load. A variant shown in FIG. 8 could consist of customizing certain converters 58 in order to allocate to them a more specific charging function (higher charging voltage than on the load). Such a function is known from 48 V rectifier/charger systems.

Once the end of charging voltage is reached with the different batteries, the high voltage regulator and the different converters resume their normal operating/maintenance voltages.

Consideration will now be given to the details of an exemplified embodiment of a photovoltaic power station according to the invention for supplying a permanent charge of 1000 watts (isolated transmission station in the Congo).

The calculation or design of the photovoltaic system is as follows:

Geographical position and insolation of the location to be supplied:

| | |
|---|---|
| Location: | CONGO (Northern axis of the Congo: OWENDO) |

-continued

| | |
|---|---|
| Latitude: | 1° north |
| Longitude: | −10° west |
| Insolation: | monthly mean values of daily insolation received by a horizontal surface on the site (kwh/m$^{2 \cdot d}$) |
| January | 5.92 |
| February | 6.21 |
| March | 6.25 |
| April | 5.14 |
| May | 4.83 |
| June | 4.59 |
| July | 4.67 |
| August | 5.65 |
| September | 5.31 |
| October | 5.26 |
| November | 5.53 |
| December | 5.29 |
| Power needs: | |
| daily needs | 25882.4 Wh/d |
| utilization voltage | 220 V |
| current needs | 123.5 Ah/d |
| Solar generator: | |
| total peak power: | 6600 Wc at 25° C., 1 kW/m$^2$, spectrum AM 1.5 |
| module types: | a) with 12 V v 48.5 Wc modules: i.e. 8 serial-parallel, 17 modules per series (136 modules) |
| | b) with 55 V × 207 Wc modules: i.e. 8 serial-parallel, 4 modules per series (32 modules) |
| Available current (Ah/d) for optimum inclination of 5°: | |
| January | 135 |
| February | 141 |
| March | 140 |
| April | 114 |
| May | 106 |
| June | 100 |
| July | 102 |
| August | 124 |
| September | 118 |
| October | 119 |
| November | 126 |
| December | 121 |
| Main storage: | |
| 1 day without sun: | 130 Ah (nominal capacity for a 10 hour discharge) |
| | 220 V nominal voltage (discharge up to 214.5 V) |
| | 45% average discharge rate |
| | 80% maximum discharge rate |
| 2 days without sun: | 260 Ah (nominal capacity for a 10 hour discharge) |
| | 220 V nominal voltage (discharge up to 214.5 V) |
| | 23% average discharge rate |
| | 80% maximum discharge rate |
| 7 days without sun: | 744 Ah (nominal capacity for a 10 hour discharge) |
| | 220 V nominal voltage (discharge up to 214.5 V) |
| | 8% average discharge rate |
| | 80% maximum discharge rate |

In the case of a one day operational duration, the battery is highly loaded (45% of daily discharge). It is therefore necessary to choose a battery having a very good cyclic loading resistance, which is not the case for a duration of seven days with a daily discharge of 8%.

Personalized DC/DC converters:

It is necessary to know the demand on each source individually, i.e. in the considered example:

Power balance of personalized sources (needs individual to the load):

|                |               |
|----------------|---------------|
| 2 V/75 A       | (150 W)       |
| 5 V/120 A      | (600 W)       |
| 12 V/10 A      | (120 W)       |
| 28 V/4 A       | (112 W)       |
| Total:         | 982 W (permanent) |

In the considered example four-different sources are required. However, other sources can be provided for other uses or loads.

At this stage it is also necessary to know the necessary operational duration of the sources (operation on battery only-case of a discharge of the main battery or failure of the DC/DC converters).

Using the case where the operational duration of the main battery is two days and, for site intervention reasons, if it is desired that the total operating autonomy of the station is to be raised to seven days, it is necessary to dimension the customized batteries to 7−2=5 days duration. Relative to the different sources, this gives the following capacities:

Source 2 V/75 A: capacity for 5 days (C/120) 9000 Ah, i.e. in C/10:6430 Ah

Source 5 V/120 A: capacity for 5 days (C/120) 14 4000 Ah, i.e. in C/10:10 286 Ah Source 12 V/10 A: capacity for 5 days (C/120) 1 200 Ah, i.e. in C/10:860 Ah Source 28 V/14 A: capacity for 5 days (C/120) 480 Ah, i.e. in C/10:345 Ah Organization of DC/DC converters The organization of the DC/DC converters can be envisaged according to different configurations, two of which are given below.

FIG. 7 corresponds to a first configuration in which the converter is equipped at the outset with an automatic charge/maintenance passage system corresponding to a voltage change applied to the storage batteries. At the output of the converter-customized battery means, there is a filtering-regulating circuit for regulating the voltage on the load. Thus, in operation on customized batteries, the voltage of the battery will vary throughout its charging/discharging cycle, whereas e.g. it is necessary to ensure a constant supply of 5.15 V on the source (5 V/120 A), hence the need of providing a regulating circuit, such as is well known to the expert. Reference can e.g. be made to the construction consisting of several MOS transistors, whose transductance characteristic is considered in order to vary the drain-source voltage. In this case, a differential amplifier can amplify the difference between the reference voltage, obtained from a Zener diode and the voltage measured at the battery/converter output. The reference voltage can be brought to zero by a microprocessor or by a voltage presence detector thus inhibiting the action of the regulator. In the case of a discharge on batteries, it is the latter circuit which regulates the discharge voltage, whereas the microprocessor limits its duration.

In this first configuration, the DC/DC converters are all connected in parallel. The capacity of the means must take account of the permanent current particular to the load, plus the recharging current of the storage batteries. The recharging time is a calculation element for the dimensioning of the converters. A recharging period of ten days is adopted in the considered example. A minimum (n+1) converters is provided in order to ensure a high reliability of the means.

On the basis of these different considerations and in such a configuration, the dimensioning of the converters on each source is as follows:

2 V/7-5-A source:

on the load 150 W are necessary, on the battery (6430/10*24))=27*2=54 W are necessary, total ~200 W necessary, on choosing a 100 W converter, taking account of the previously defined redundancy, we obtain 2+1=3 100 W converters on said 2 V/75 A source.

5 V/120 A source:

on the load 600 W are necessary, on the battery (10 286/(10*24))=42.8*5=215 W are necessary, total ~800 W are necessary, on choosing a unitary 2G.0 W converter and taking account of the previously defined redundancy, we obtain 4+1=5 200 W converters on said 5 V/120 A source.

12 V/10 A source:

on the load 120 W are necessary, on the battery (860/(10*24))=3.6*12=43.2 W are necessary, total ~150 W are necessary, on choosing a 75 W converter and taking account of the previously defined redundancy, we obtain 2+1=3 75 W converters on said 12 V/10 A source.

28 V/4 A source:

on the load 112 W are necessary, on the battery (345/(10*24))=1.44*28=41 W are necessary, total ~150 W are necessary, on choosing a 75 W converter and taking account of the previously defined redundancy, we obtain 2+1=3 75 W converters on said 28 V/4 A source.

The unitary power of each converter can be determined as a function of the overall dimensions given or a desired standardization.

In summarizing, we obtain for this first configuration:

2 V source: 3 100 W, 220/2 V converters

5 V source: 5 200 W, 220/5 V converters

12 V source: 3 75 W, 220/12 V converters

2 V source: 3 75 W, 220/28 V converters

A second configuration consists of allocating converters solely to the charging of the customized batteries and this solution is shown in FIG. 8. FIG. 8 uses the same references as in FIG. 7, but charging converters 58 are additionally shown.

In this second configuration the output voltage of the converters can be regulated independently of the-output voltage of the converters direct on the load. In this case the redundancy of the converters is calculated solely on the basis of the needs of the load, the charging circuit of the batteries being considered as a reserve circuit. This leads to an equipment gain. Moreover, it is possible to envisage an interruption of the charging converter when the associated battery is charged, thus leading to an economy in the overall consumption of the station.

In this second configuration the dimensioning is as follows:

2 V/75 A source:

on the load 150 W are necessary, on the battery (6430(10*24))=27*2=54 W are necessary, a 50 W converter is used, on choosing a 75 W converter, we obtain 2+1=3 75 W converters.

V/120 A source:
on the load 600 W are necessary,
on the battery (10286/10*24))=42.8*5=215 W are necessary,
a 200 W converter is used,
on choosing a 200 W converter, we obtain 3+1=4 200 W converters.
12 V/10 A source:
on the load 120 W are necessary,
on the battery (860/(10*24))=3.6*12=43.2 W are necessary,
a 50 W converter is used, on choosing a 50 W converter, we obtain 3+1=4 50 W converter.
28 V/4 A source:
on the load 112 W are necessary,
on the battery (345/(10*24))=1.44*28=41 W are necessary,
a 50 W converter is used,
on choosing a 50 W converter, we obtain 2+1=3 50 W converter.

On comparing the two configurations, it can be seen that the installed power difference for the converters is:

(3*100)+(5*20.0)+3*75)+(3*75)=1750 W    Configuration 1

(3*75)+50+(4*200)+200+(4*50)+50+(3*50)+
50=1725 W                              Configuration 2

Thus, there is a difference of −25 W on the installed power and in the charged battery case the difference becomes (1750−1375)=375 W.

With conventional, stationary, lead batteries, use is made of 2 V unitary components. With nickel-cadmium components use is made of 1.2 V unitary components. A splitting of the different battery types is possible and the charge is personalized for each battery type. The number of components per source is a function of the voltage to be supplied and the chosen redundancy.

On returning to the above-considered example:

On the 2 V source: 2 3215 Ah, stationary, lead components in parallel

On the 5 V source: 2×3 3600 Ah, stationary, lead components in parallel

On the 12 V source: 6 860 Ah, stationary, lead components (+diode)

On the 28 V source: 14 345 Ah, stationary, lead components (+diode).

In such a configuration all the batteries are rendered secure (due to a type C/2 redundancy or passage diodes on the low capacity components). This configuration corresponds to a high reliability telecommunications station. This security is not necessary in most cases.

These batteries are not normally loaded, because the main battery assumes the supply of the nightly ampere-hours on a daily basis. In the considered example, a discharge would only occur after two days without sun which, as a function of the locations and related to the year, only represents a limited cyclic loading. Therefore the good cyclic loading resistance is not a choice criterion for such batteries.

Figure 9:
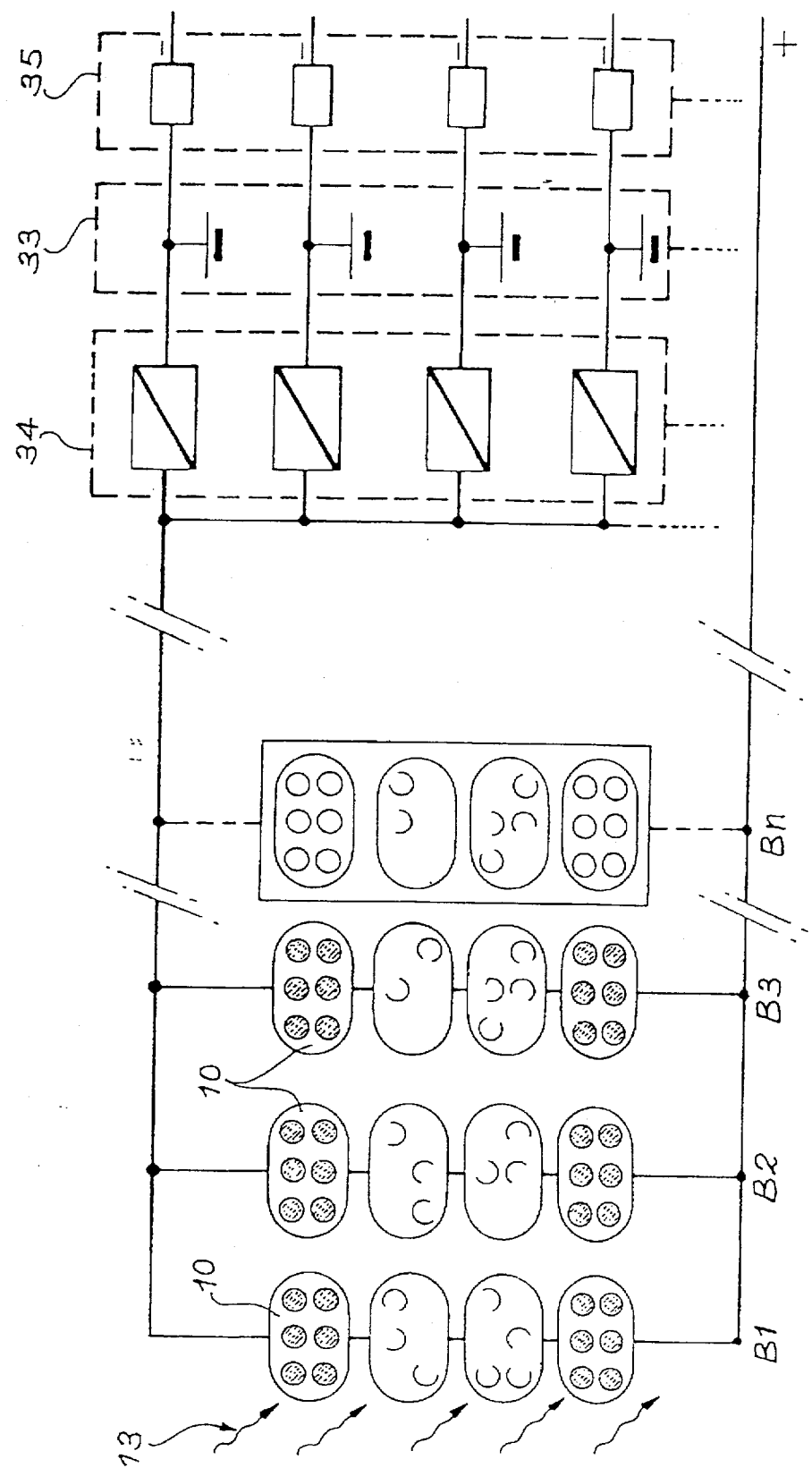
FIG. 9 illustrates a variant of the station according to the invention (the main storage being eliminated).

For simplification purposes, it is also possible to eliminate the high voltage storage, as well as the associated high voltage charging regulator, the storage then being transferred to the customized batteries as shown in FIG. 9, the references therein being the same as in FIG. 4.

For very low intensities, such as that of the 28 V/4 A source of the considered example, use can be made of 6 or 12 V unitary battery blocks (supplementary space gain). In addition, the operational duration of these sources is not necessarily the same as on the other sources. For example, if these voltages are e.g. used for remote alarm transfer, once the terminal system has been informed of the alarm, it is no longer necessary to maintain its supply on a local basis. Thus, an economy and space gain can be envisaged on the customized storage of this source (not taken into account in the example). This illustrates the advantages provided by such a power station.

Figure 10:
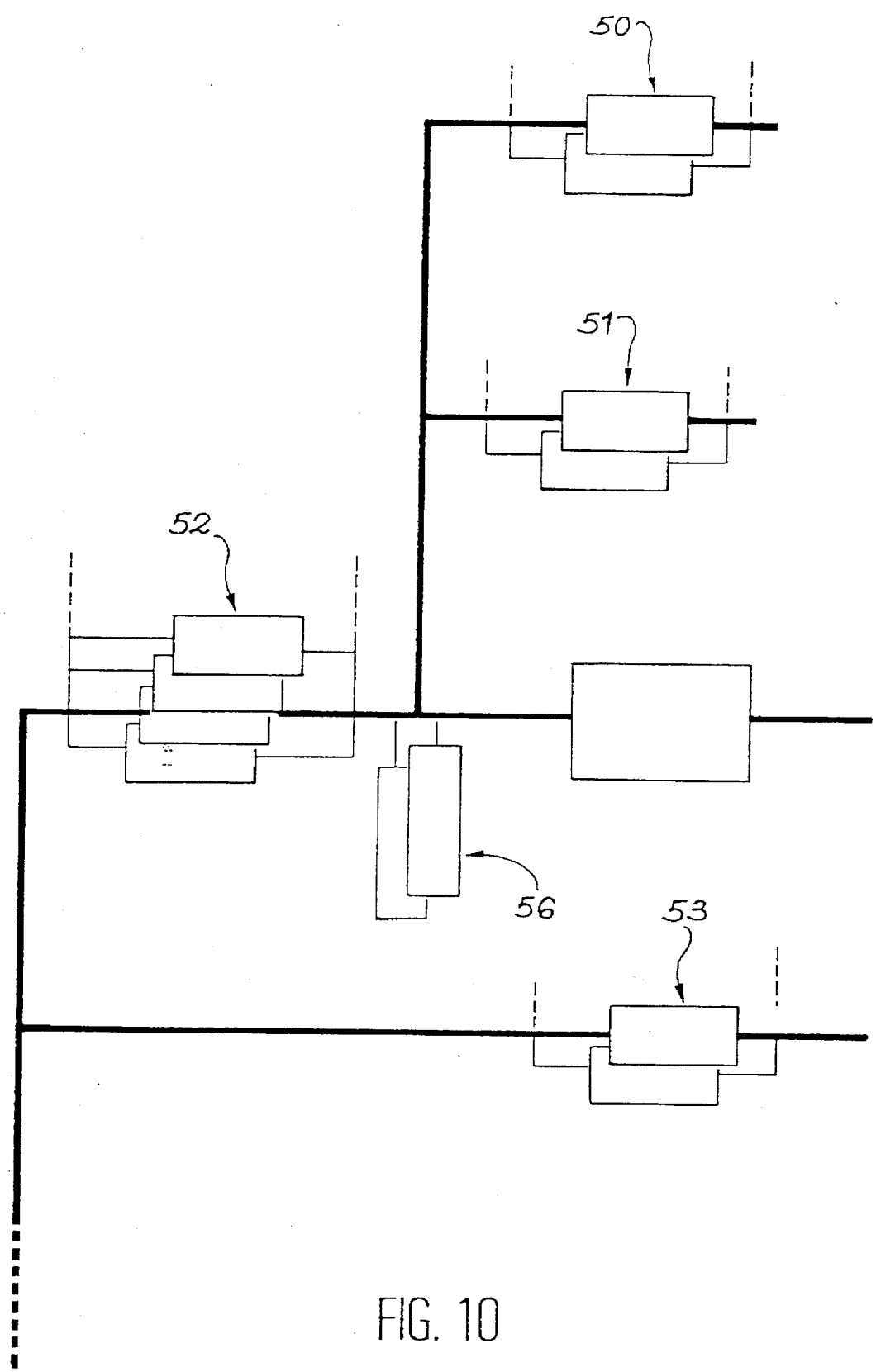
FIG. 10 illustrates a variant of the customized storage according to the invention (a single customized storage battery).

Another variant of the invention consists of storing the power solely on one or two customized batteries and ensuring the supply of the sources by converters adapted to the storage sources, as shown in FIG. 10, where the same references as in FIG. 8 are used.

Thus, the relay telecommunications station considered in exemplified manner is at an isolated location (i.e. isolated from any commercial electric power distribution network) and below the equator. FIG. 6 gives an idea of the installation of the different components of the station using the configuration of FIG. 4, which is the most complete (but also the most disadvantageous as regards equipment). It is possible to see the solar field 45 remote from the shelter 46 and constituted by two separate compartments or parts, namely the telecommunications equipment room 47 and the power room 48.

In this case the invention is characterized in that the telecommunications equipments are completely separate from the power equipments. The heat evolved by the telecommunications equipments is minimal, so that no ventilation is necessary, a completely sealed and thermally insulated enclosure being provided. This arrangement avoids the well known problems existing under equatorial climatic conditions, i.e. humidity, heat, penetration of dust, insects, rodents, etc.

Figure 11:
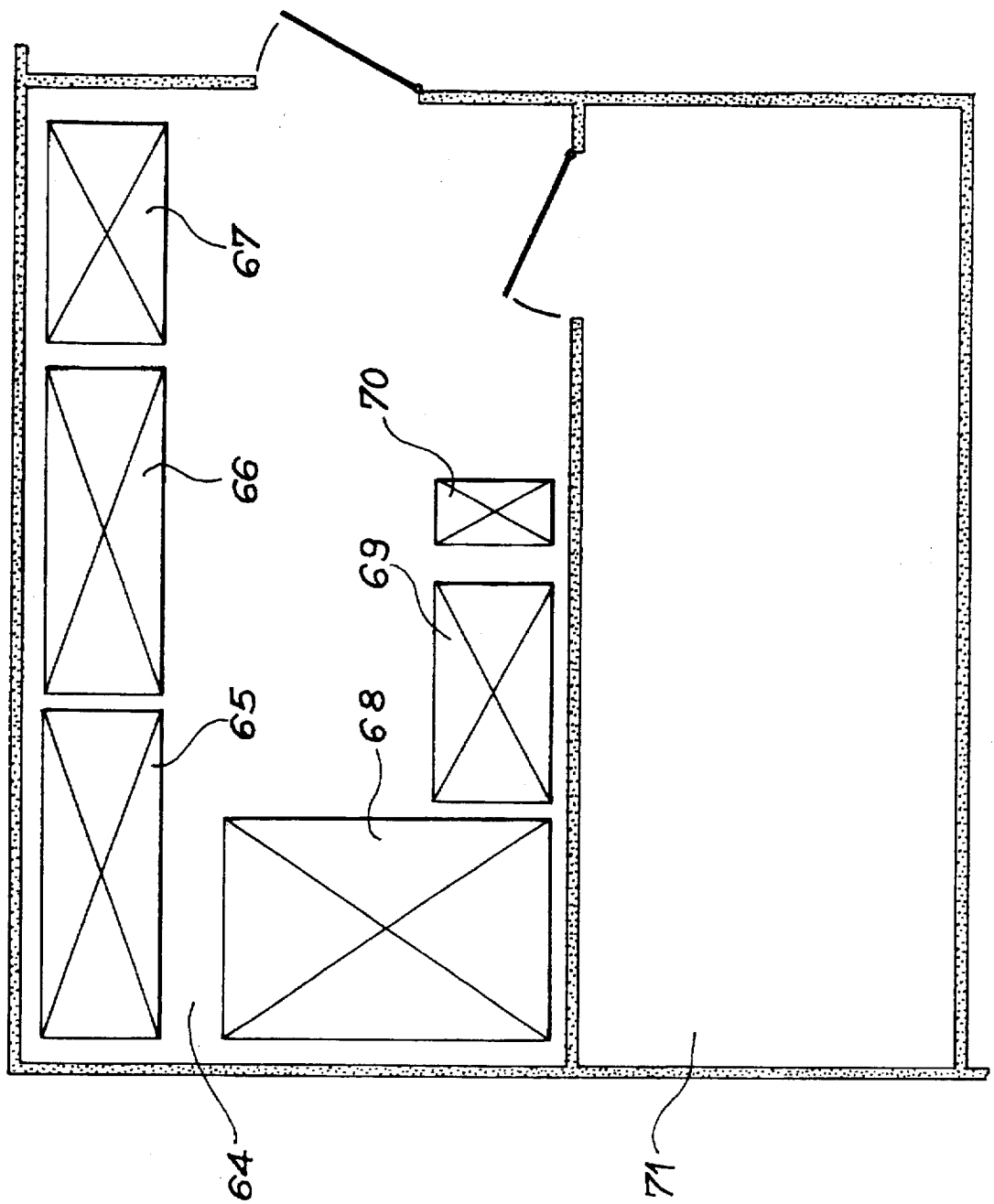
FIG. 11 illustrates the practical organization of a station according to the invention.

The plan of the power room 64 is shown in FIG. 11, taking account of the real dimensions of the batteries and converters, i.e. 220 V batteries (65) and (66), 2 V batteries (67), 5 V batteries (68), 12 and 28 V batteries (69) and converter bay (70). At 71 is shown the telecommunications equipment room.

The very modest size of the DC/DC converters should be noted. In exemplified manner, a 220 V/5 V, 200 W converter has the following dimensions: L=8.3 cm, H=1.27 cm, P=8.6 cm.

We claim:

1. A double storage, high voltage, photovoltaic power station having a plurality of photovoltaic solar modules, each comprising a plurality of unitary voltage modules in series-parallel connection, said power station further comprising a main, high voltage storage device constituted by a storage battery, at least one customized storage device, at least one conversion device between the main storage device and the at least one customized storage device, a high voltage link between the main storage device and the conversion device, a charging regulator for the main storage device, and at least one regulating device for each of a plurality of different loads.

2. Station according to claim 1, wherein the photovoltaic solar modules are minimum 55 V, unitary voltage modules.

3. Station according to claim 1, wherein the main storage device is constituted by a plurality of storage batteries connected in series, whose total voltage is at least 220 V and whose capacity is a function of the charge and the desired operating duration without insolation.

4. Station according to claim 3, wherein the storage batteries are either of the large electrolyte reserve, stationary, lead type, or sealed, or cadmium-nickel.

5. Station according to claim 4, wherein the stationary batteries have an electrolyte brazing system.

6. Station according to claim 3, wherein a bypass diode is placed across each storage battery so as to ensure operational continuity in the case of component breakage.

7. Station according to claim 1, wherein the at least one conversion device comprises a plurality of DC/DC converters, arranged in parallel or in series, starting from 220 V DC in order to supply the voltages necessary for a load.

8. Station according to claim 1, wherein the at least one customized storage battery is either large electrolyte reserve, stationary, lead solar batteries or gas recombination, sealed batteries, or cadmium-nickel batteries, the charging and maintenance of said batteries being obtained by DC/DC converters, whose output voltage is regulatable from 20 to 60%.

9. Station according to claim 1, wherein said conversion device comprises a converter equipped with an automatic charging/maintenance passage system corresponding to a voltage change applied to the storage battery components.

10. Station according to claim 9, which comprises a filtering-regulating circuit for regulating the voltage on a load.

11. Station according to claim 9, which wherein said converter comprises DC/DC converters in serial-parallel groups, the capacity of the DC/DC converters taking account of the permanent current particular to the load, as well as the recharging current of the storage batteries.

12. Station according to claim 1, which comprises converters allocated solely to the charging of the batteries.

13. Station according to claim 12, wherein the output voltage of the converters is regulated independently of the output voltage of the converters connected to the loads, the redundancy of the converters being calculated solely on the basis of the needs of the load, the charging circuit for the batteries being a reserve circuit.

14. Station according to claim 1, wherein the high voltage storage is transferable into the customized storage device.

15. Station according to claim 1, which has converters, customized batteries and customized regulators permitting the direct supply of all the loads.

16. Station according to claim 1, which comprises telecommunications equipments completely separate from the power equipments, a completely sealed and thermally insulated enclosure being provided.

* * * * *